US012633962B2

(12) United States Patent (10) Patent No.: US 12,633,962 B2
Zhao et al. (45) Date of Patent: May 19, 2026

(54) FULL-DUPLEX DIGITAL SELF-INTERFERENCE CLEAR METHOD AND APPARATUS

(71) Applicant: SANECHIPS TECHNOLOGY CO., LTD., Shenzhen (CN)

(72) Inventors: Yanyan Zhao, Shenzhen (CN); Wen Cao, Shenzhen (CN); Minna Xie, Shenzhen (CN); Huan Jing, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 125 days.

(21) Appl. No.: 18/697,029

(22) PCT Filed: Mar. 2, 2022

(86) PCT No.: PCT/CN2022/078768
§ 371 (c)(1),
(2) Date: Mar. 29, 2024

(87) PCT Pub. No.: WO2023/050717
PCT Pub. Date: Apr. 6, 2023

(65) Prior Publication Data
US 2024/0405797 A1 Dec. 5, 2024

(30) Foreign Application Priority Data

Sep. 29, 2021 (CN) .......................... 202111152888.7

(51) Int. Cl.
H04B 1/525 (2015.01)
(52) U.S. Cl.
CPC .................................... H04B 1/525 (2013.01)
(58) Field of Classification Search
CPC ..................................................... H04B 1/525
See application file for complete search history.

(56) References Cited

U.S. PATENT DOCUMENTS 9,860,052 B2 * 1/2018 McCoy .................... H04B 1/44
2009/0180404 A1 7/2009 Jung
(Continued)

FOREIGN PATENT DOCUMENTS

| CN | 108111186 A | 6/2018 |
|----|-------------|--------|
| CN | 108599789 A | 9/2018 |
| CN | 108768423 A | 11/2018 |

OTHER PUBLICATIONS

WIPO, International Search Report issued on May 30, 2022.

*Primary Examiner* — David B Lugo
(74) *Attorney, Agent, or Firm* — Li & Cai Intellectual Property (USA) Office

(57) ABSTRACT

The present disclosure provides a full-duplex digital self-interference clear method, including: before a signal is transmitted with a peer device in a full-duplex mode, performing a calculation by a self-adaptive algorithm to obtain a pre-distortion processing coefficient; under the condition that the signal is transmitted with the peer device in the full-duplex mode, performing pre-distortion processing on a first signal sent by the transmit link to the peer device according to the pre-distortion processing coefficient to obtain a second reconstructed interference signal; and performing self-interference clear according to the second reconstructed interference signal and a second interference signal of the receive link, with the second interference signal being a signal obtained through superimposition of an interference signal generated by the first signal in the receive link and a second signal received by the receive link from the peer device. The present disclosure further provides a full-duplex digital self-interference clear apparatus.

11 Claims, 2 Drawing Sheets

Before signal is transmitted with a peer device in a full-duplex mode, a pre-distortion processing coefficient is obtained by performing a calculation by a self-adaptive algorithm according to a preamble sequence sent from a transmit link, a first interference signal generated by the preamble sequence in a receive link, and A first reconstructed interference signal obtained by performing pre-distortion processing and reconstruction on the preamble sequence — S21

Under the condition that the signal is transmitted with the peer device in the full-duplex mode, a first signal sent by the transmit link to the peer device is subjected to pre-distortion processing according to the pre-distortion processing coefficient to obtain a second reconstructed interference signal — S22

Self-interference clear is performed according to the second reconstructed interference signal and a second interference signal of the receive link; and the second interference signal of the receive link is a signal obtained through superimposition of the interference signal generated by the first signal in the receive link and a second signal received by the receive link from the peer device — S23

(56) References Cited

U.S. PATENT DOCUMENTS

2019/0181897 A1    6/2019  Baek
2022/0376713 A1 *  11/2022  Carbone ............. H04B 1/0082

* cited by examiner

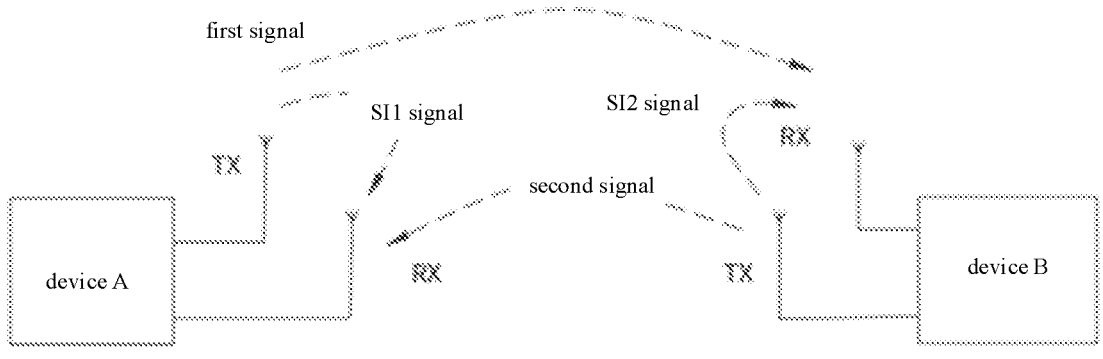

FIG. 1

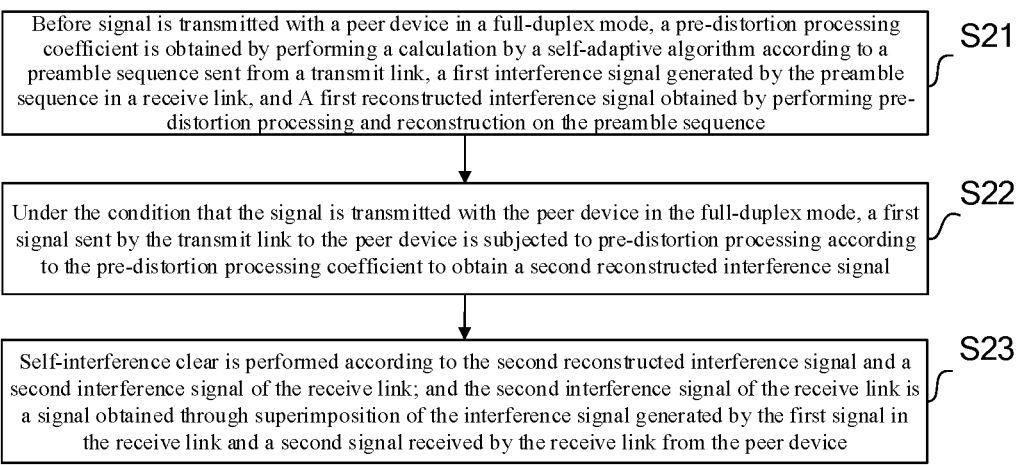

Before signal is transmitted with a peer device in a full-duplex mode, a pre-distortion processing coefficient is obtained by performing a calculation by a self-adaptive algorithm according to a preamble sequence sent from a transmit link, a first interference signal generated by the preamble sequence in a receive link, and A first reconstructed interference signal obtained by performing pre-distortion processing and reconstruction on the preamble sequence — S21

Under the condition that the signal is transmitted with the peer device in the full-duplex mode, a first signal sent by the transmit link to the peer device is subjected to pre-distortion processing according to the pre-distortion processing coefficient to obtain a second reconstructed interference signal — S22

Self-interference clear is performed according to the second reconstructed interference signal and a second interference signal of the receive link; and the second interference signal of the receive link is a signal obtained through superimposition of the interference signal generated by the first signal in the receive link and a second signal received by the receive link from the peer device — S23

FIG. 2

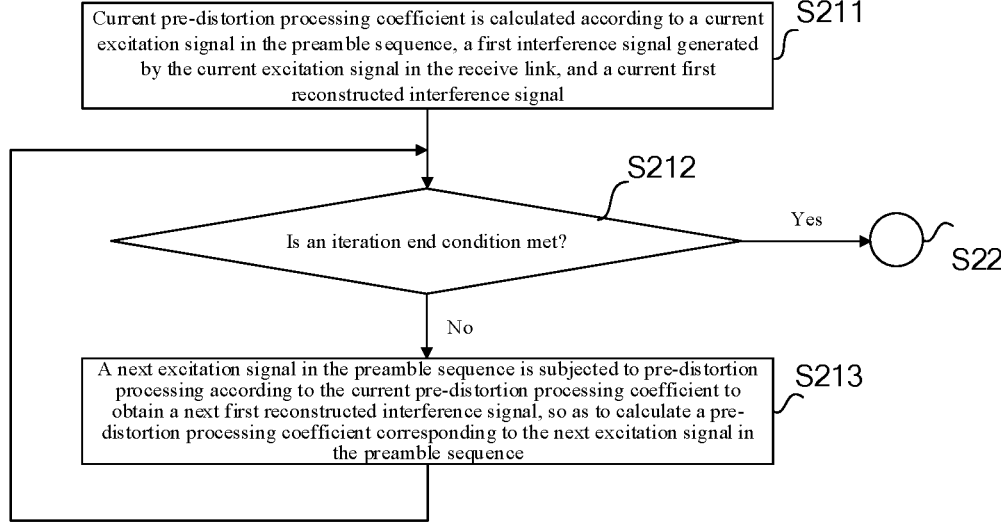

Current pre-distortion processing coefficient is calculated according to a current excitation signal in the preamble sequence, a first interference signal generated by the current excitation signal in the receive link, and a current first reconstructed interference signal — S211

Is an iteration end condition met? — S212

Yes — S22

No

A next excitation signal in the preamble sequence is subjected to pre-distortion processing according to the current pre-distortion processing coefficient to obtain a next first reconstructed interference signal, so as to calculate a pre-distortion processing coefficient corresponding to the next excitation signal in the preamble sequence — S213

FIG. 3

FULL-DUPLEX DIGITAL
SELF-INTERFERENCE CLEAR METHOD
AND APPARATUS

CROSS REFERENCE TO RELATED
APPLICATIONS

The present disclosure is a National Phase Application filed under 35 U.S.C. 371 as a national stage of PCT/CN2022/078768, filed on Mar. 2, 2022 and claims the priority to Chinese Patent Application No. 202111152888.7 entitled "FULL-DUPLEX DIGITAL SELF-INTERFERENCE CLEAR METHOD AND APPARATUS" and filed with the CNIPA on Sep. 29, 2021, the contents of which are incorporated herein by reference in their entirety.

TECHNICAL FIELD

Embodiments of the present disclosure relate to the technical field of communications, and in particular, to a full-duplex digital self-interference clear method and apparatus.

BACKGROUND

With the development of wireless communication systems, radio spectrum resources become more and more scarce, and 5G (5th Generation Mobile Communication Technology) wireless systems and other wireless systems are desired to provide higher and higher data rates for users to meet access service requirements of the users. The mobile communication technology of the last generation mainly adopts a half-duplex transmission mode. When a full-duplex mode is adopted, transmission and reception are generally carried out in different frequency bands. Due to interference, it is generally impossible for radio signals to be transmitted and received in the same frequency band. The full-duplex mode is given a new meaning in recent years: a device can perform transmission and reception at the same time and at the same frequency. A main challenge to implementation of the full-duplex mode is Self-Interference (SI) signals, i.e., some of transmitted signals that leak from a transmit link into a receive link. However, it is very difficult to remove the SI signals from a total received signal, and Self-Interference Clear (SIC) needs to be performed from the aspect of antennas, the aspect of radio frequency, and a digital aspect. A main function of SIC in a propagation domain and an analog domain is to avoid saturation of a receiver caused by high power of the SI signals. When total power of received signals exceeds a dynamic range of an analog-to-digital converter (ADC), accuracy after analog to digital conversion may be limited. The meaning of a digital domain is to clear residual SI signals. The digital domain generally adopts active SIC. Auxiliary link SIC is one of active SIC techniques. An auxiliary link decides performance of clearing of the SI signals. Therefore, how to improve accuracy of recovering the SI signals by the auxiliary link and system versatility is an urgent problem to be solved.

SUMMARY

The present disclosure provides a full-duplex digital self-interference clear method and apparatus.

In a first aspect, an embodiment of the present disclosure provides a full-duplex digital self-interference clear method, including: before a signal is transmitted with a peer device in a full-duplex mode, performing a calculation by a self-adaptive algorithm to obtain a pre-distortion processing coefficient according to a preamble sequence sent from a transmit link, a first interference signal generated by the preamble sequence in a receive link, and a first reconstructed interference signal obtained by performing pre-distortion processing and reconstruction on the preamble sequence; under the condition that the signal is transmitted with the peer device in the full-duplex mode, performing pre-distortion processing on a first signal sent by the transmit link to the peer device according to the pre-distortion processing coefficient to obtain a second reconstructed interference signal; and performing self-interference clear according to the second reconstructed interference signal and a second interference signal of the receive link, with the second interference signal of the receive link being a signal obtained through superimposition of an interference signal generated by the first signal in the receive link and a second signal received by the receive link from the peer device.

In some embodiments, the self-adaptive algorithm includes: a Least Squares (LS) algorithm, a Recursive Least Squares (RLS) algorithm, or a Least Mean Squares (LMS) algorithm.

In some embodiments, responsive to determining that the self-adaptive algorithm is the RLS algorithm or the LMS algorithm, performing a calculation by the self-adaptive algorithm according to the preamble sequence sent from the transmit link, the first interference signal generated by the preamble sequence in the receive link, and the first reconstructed interference signal obtained by performing pre-distortion processing and reconstruction on the preamble sequence to obtain the pre-distortion processing coefficient includes: calculating a current pre-distortion processing coefficient according to a current excitation signal in the preamble sequence, a first interference signal generated by the current excitation signal in the receive link, and a current first reconstructed interference signal; wherein the current first reconstructed interference signal is obtained by performing pre-distortion processing and reconstruction on the current excitation signal according to a pre-distortion processing coefficient obtained by a previous calculation; and in response to determining that an iteration end condition is not met, performing pre-distortion processing on a next excitation signal in the preamble sequence according to the current pre-distortion processing coefficient to obtain a next first reconstructed interference signal, so as to calculate a pre-distortion processing coefficient corresponding to the next excitation signal in the preamble sequence.

In some embodiments, performing pre-distortion processing on the first signal sent by the transmit link to the peer device according to the pre-distortion processing coefficient to obtain the second reconstructed interference signal includes: in response to determining that the iteration end condition is met, performing pre-distortion processing on the first signal sent by the transmit link to the peer device according to the current pre-distortion processing coefficient to obtain the second reconstructed interference signal.

In some embodiments, the iteration end condition being met includes: a current number of times of iterations being equal to a preset number of times, with the preset number of times being the same as a number of excitation signals in the preamble sequence; or a difference between the first interference signal generated by the current excitation signal in the receive link and the current first reconstructed interference signal being less than a preset threshold.

In the other aspect, an embodiment of the present disclosure further provides a full-duplex digital self-interference clear apparatus, including a transmit link, a receive link, an auxiliary link, a self-adaptive learning module, a pre-distortion processing module, and a self-interference clear module, wherein the pre-distortion processing module is connected to the self-adaptive learning module, the auxiliary link, and the self-interference clear module, and the self-adaptive learning module is connected to the transmit link and the receive link; the transmit link is configured to send a first signal to a peer device under the condition that signal is transmitted with the peer device in a full-duplex mode; the receive link is configured to receive a second signal sent by the peer device under the condition that the signal is transmitted with the peer device in the full-duplex mode; the transmit link is further configured to send a preamble sequence before the signal is transmitted with the peer device in the full-duplex mode; the self-adaptive learning module is configured to, before the signal is transmitted with the peer device in the full-duplex mode, perform a calculation by a self-adaptive algorithm to obtain a pre-distortion processing coefficient according to the preamble sequence sent from the transmit link, the first interference signal generated by the preamble sequence in the receive link, and the first reconstructed interference signal obtained by performing pre-distortion processing and reconstruction on the preamble sequence; the pre-distortion processing module and the auxiliary link are configured to perform pre-distortion processing and reconstruction on the preamble sequence to obtain the first reconstructed interference signal, and under the condition that the signal is transmitted with the peer device in the full-duplex mode, perform pre-distortion processing on the first signal sent by the transmit link to the peer device according to the pre-distortion processing coefficient to obtain a second reconstructed interference signal; and the self-interference clear module is configured to perform self-interference clear according to the second reconstructed interference signal and a second interference signal of the receive link; and the second interference signal of the receive link is a signal obtained through superimposition of an interference signal generated by the first signal in the receive link and the second signal received by the receive link from the peer device.

In some embodiments, a structure of the auxiliary link is the same as a structure of the transmit link, or the structure of the auxiliary link is the same as a structure of the receive link.

In some embodiments, the self-adaptive learning module is further configured to perform a calculation by an LS algorithm, an RLS algorithm, or an LMS algorithm to obtain the pre-distortion processing coefficient.

In some embodiments, the self-adaptive learning module is further configured to perform a calculation by the RLS algorithm or the LMS algorithm to obtain the pre-distortion processing coefficient; wherein a current pre-distortion processing coefficient is calculated according to a current excitation signal in the preamble sequence, a first interference signal generated by the current excitation signal in the receive link, and a current first reconstructed interference signal, and the current first reconstructed interference signal is obtained by performing pre-distortion processing and reconstruction on the current excitation signal according to a pre-distortion processing coefficient obtained by a previous calculation; the pre-distortion processing module and the auxiliary link are further configured to, in response to determining that an iteration end condition is not met, perform pre-distortion processing on a next excitation signal in the preamble sequence according to the current pre-distortion processing coefficient to obtain a next first reconstructed interference signal, so as to enable the self-adaptive learning module to calculate a pre-distortion processing coefficient corresponding to the next excitation signal in the preamble sequence.

In some embodiments, the pre-distortion processing module and the auxiliary link are further configured to, in response to determining that the iteration end condition is met, perform pre-distortion processing on the first signal sent by the transmit link to the peer device according to the current pre-distortion processing coefficient, so as to obtain the second reconstructed interference signal.

In some embodiments, the iteration end condition being met includes: a current number of times of iterations being equal to a preset number of times, with the preset number of times being the same as a number of excitation signals in the preamble sequence; or a difference between the first interference signal generated by the current excitation signal in the receive link and the current first reconstructed interference signal being less than a preset threshold.

According to the full-duplex digital self-interference clear method provided in the embodiments of the present disclosure, before the signal is transmitted with the peer device in the full-duplex mode, the pre-distortion processing coefficient is obtained by performing a calculation by the self-adaptive algorithm according to the preamble sequence sent from the transmit link, the first interference signal generated by the preamble sequence in the receive link, and the first reconstructed interference signal obtained by performing pre-distortion processing and reconstruction on the preamble sequence; under the condition that the signal is transmitted with the peer device in the full-duplex mode, the first signal sent from the transmit link to the peer device is subjected to pre-distortion processing according to the pre-distortion processing coefficient to obtain the second reconstructed interference signal, self-interference clear is performed according to the second reconstructed interference signal and a second interference signal of the receive link, and the second interference signal is the signal obtained through superposition of the interference signal generated by the first signal in the receive link and the second signal received by the receive link from the peer device. According to the embodiments of the present disclosure, co-time co-frequency full-duplex signal transmission and reception are supported, and the pre-distortion processing coefficient is generated through self-adaptive learning. On the one hand, accuracy of the pre-distortion processing coefficient can be improved, so that the interference signal can be counteracted to the greatest extent by the signal obtained through pre-distortion processing according to the pre-distortion processing coefficient, thereby improving the full-duplex digital self-interference clear effect; on the other hand, the pre-distortion processing coefficient is independent of the preamble sequence, the transmit link, the receive link and a signal transmission environment, thereby enhancing flexibility and universality of the system.

BRIEF DESCRIPTION OF DRAWINGS

FIG. 1 is a schematic diagram of architecture of a full-duplex digital communication system according to an embodiment of the present disclosure;

FIG. 2 is a flowchart illustrating a full-duplex digital self-interference clear method according to an embodiment of the present disclosure;

FIG. 3 is a flowchart of performing a calculation by a self-adaptive algorithm to obtain a pre-distortion processing coefficient according to an embodiment of the present disclosure;

DETAIL DESCRIPTION OF EMBODIMENTS

Figure 4:
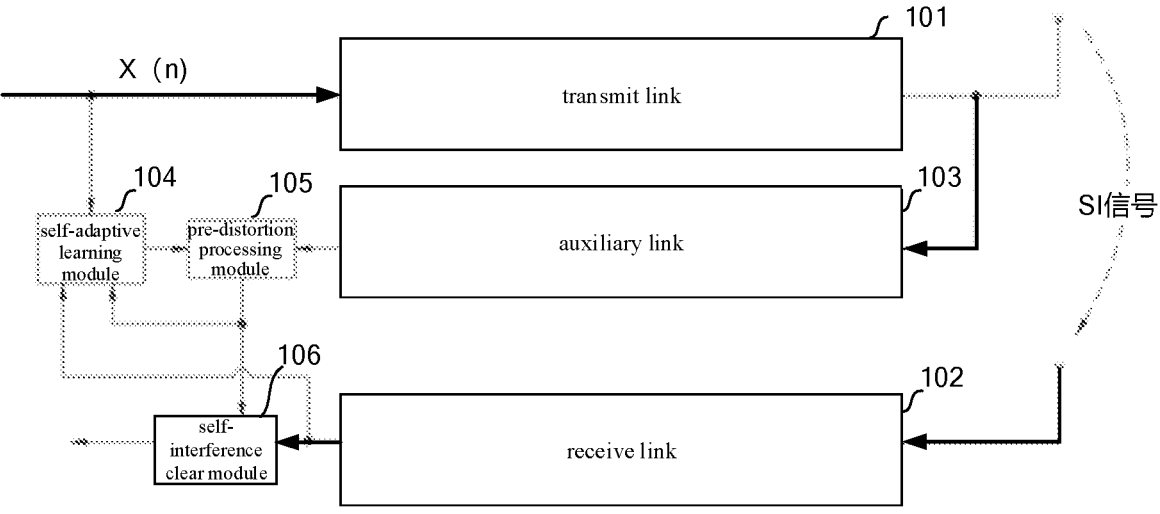
FIG. 4 is a schematic diagram of a full-duplex digital self-interference clear apparatus according to an embodiment of the present disclosure.

Exemplary embodiments will be described more fully below with reference to the drawings, but the exemplary embodiments may be embodied in different forms, and should not be interpreted as being limited to the embodiments described herein. Rather, the embodiments are provided to make the present disclosure thorough and complete, and are intended to enable those of ordinary skill in the art to fully understand the scope of the present disclosure.

The term "and/or" used herein includes any and all combinations of one or more associated listed items.

The terms used herein are merely used to describe specific embodiments, and are not intended to limit the present disclosure. As used herein, "a" and "the" which indicate a singular form are intended to include a plural form, unless expressly stated in the context. It should be further understood that the term(s) "include" and/or "be made of" used herein indicate(s) the presence of the described features, integers, operations, elements and/or components, but do not exclude the presence or addition of one or more other features, integers, operations, elements, components and/or combinations thereof.

The embodiments described herein can be described with reference to plans and/or cross-sectional views with the aid of idealized schematic diagrams of the present disclosure. Accordingly, the exemplary drawings may be modified according to manufacturing techniques and/or tolerances. Therefore, the embodiments are not limited to those illustrated by the drawings, but include modifications to configuration formed based on a manufacturing process. Thus, regions shown in the drawings are illustrative, and shapes of the regions shown in the drawings illustrate specific shapes of regions of elements, but are not intended to make limitations.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

An embodiment of the present disclosure provides a full-duplex digital self-interference clear method, which is applied to a system shown in FIG. 1. As shown in FIG. 1, signals are transmitted between a device A and a device B in a full-duplex mode, and the device A and the device B are peer devices for each other. A transmit link (Tx) of the device A sends a first signal to the device B, and the first signal generates an interference signal SI1 in a receive link (Rx) of the device A. Meanwhile, the receive link of the device A receives a second signal sent by the device B. A transmit link (Tx) of the device B sends the second signal to the device A, and the second signal generates an interference signal SI2 in a receive link (Rx) of the device B. Meanwhile, the receive link (Rx) of the device B receives the first signal sent by the device A.

The full-duplex digital self-interference clear method according to the embodiment of the present disclosure is applied to a device (i.e., a full-duplex digital self-interference clear apparatus) for full-duplex communication. A structure of the full-duplex digital self-interference clear apparatus is shown in FIG. 4, and includes a transmit link (Tx), a receive link (Rx), an auxiliary link, a self-adaptive learning module, a pre-distortion processing module (DPD), and a self-interference clear module (SIC). The pre-distortion processing module is connected to the self-adaptive learning module, the auxiliary link, and the self-interference clear module (SIC). The self-adaptive learning module is connected to the transmit link and the receive link. A principle of full-duplex digital self-interference clear is as follows: a baseband In-phase Quadrature (IQ) signal of a transmit signal is replicated in a digital domain, a signal for SIC is generated with an additional transmitter (i.e., the transmit link) and is fed back to a receiver (i.e., the receive link), and the receiver subtracts a reconstructed interference signal generated by the auxiliary link from a total signal.

With reference to FIG. 4 and FIG. 2, the full-duplex digital self-interference clear method according to the embodiment of the present disclosure includes the following operations 21 to 23.

In operation 21, before a signal is transmitted with a peer device in a full-duplex mode, a pre-distortion processing coefficient is obtained by performing a calculation by a self-adaptive algorithm according to a preamble sequence sent from a transmit link, a first interference signal generated by the preamble sequence in a receive link, and a first reconstructed interference signal obtained by performing pre-distortion processing and reconstruction on the preamble sequence.

Before a signal is transmitted between a current device and the peer device in the full-duplex mode, the transmit link of the current device firstly sends the preamble sequence X(n) including a plurality of (n) consecutive excitation signals; and in the process of sending the preamble sequence X(n), the excitation signals of the preamble sequence X(n) generate the first interference signals $y_{ord1}$ in the receive link. It should be noted that the current device and the peer device have not performed signal transmission yet at the stage of sending the preamble sequence X(n), and therefore, merely the first interference signals $y_{ord1}$ generated by the preamble sequence X(n) exist in the receive link of the current device.

In this operation, a self-adaptive learning module performs a calculation by the self-adaptive algorithm according to the preamble sequence X(n) sent from the transmit link, the first interference signals $y_{ord1}$, and first reconstructed interference signals $y_{aux1}$, and sends the pre-distortion processing coefficient obtained by the calculation to the pre-distortion processing module (DPD). The first reconstructed interference signals $y_{aux1}$ are interference signals obtained by the pre-distortion processing module (DPD) and the auxiliary link performing pre-distortion processing and reconstruction on the preamble sequence X(n). The self-adaptive learning module may adopt an existing self-adaptive algorithm to calculate the pre-distortion processing coefficient, and the self-adaptive algorithm is an algorithm which automatically adjusts itself according to data characteristics of processed data, a processing method, a processing order, a processing parameter, a boundary condition or a constraint condition in processing and analyzing processes to adapt to statistical distribution characteristics and structural characteristics of the processed data for obtaining an optimal processing effect.

In operation 22, under the condition that the signal is transmitted with the peer device in the full-duplex mode, a first signal sent from the transmit link to the peer device is subjected to pre-distortion processing according to the pre-distortion processing coefficient to obtain a second reconstructed interference signal.

After the sending of the preamble sequence X(n) is completed, the corresponding pre-distortion processing coefficient is obtained through self-adaptive learning, so the process may enter a next stage, i.e., a stage of performing full-duplex communication with the peer device.

In this operation, in the process of transmitting the signals between the current device and the peer device in the full-duplex mode, the transmit link of the current device sends the first signal to the peer device, and the first signal is an interference-free useful signal. At this time, the first signal generates an interference signal $y_{ord1\text{-}2}$ in the receive link. The pre-distortion processing module (DPD) and the auxiliary link perform pre-distortion processing on the first signal (i.e., a loopback signal of the transmit link) according to the pre-distortion processing coefficient obtained by the calculation in the operation 21 to obtain the second reconstructed interference signal $y_{aux2}$, and the pre-distortion processing module (DPD) sends the second reconstructed interference signal $y_{aux2}$ to the self-interference clear module (SIC); and the second reconstructed interference signal $y_{aux2}$ is a reconstructed signal of a second interference signal $y_{ord2}$.

In operation 23, self-interference clear is performed according to the second reconstructed interference signal and the second interference signal of the receive link; and the second interference signal of the receive link is a signal obtained through superimposition of the interference signal generated by the first signal in the receive link and a second signal received by the receive link from the peer device.

In this operation, the self-interference clear module (SIC) of the current device achieves self-interference clear by subtracting the second reconstructed interference signal $y_{aux2}$ from the second interference signal $y_{ord2}$ of the receive link, and the second interference signal $y_{ord2}$ of the receive link is the signal obtained through superimposition of the interference signal $y_{ord1\text{-}2}$ generated by the first signal in the receive link and the second signal received by the receive link from the peer device.

According to the present embodiment, a process of the self-interference clear is expressed as: the second interference signal $y_{ord2}$ of the receive link–the second reconstructed interference signal $y_{aux2}$=the interference signal $y_{ord1\text{-}2}$ generated by the first signal in the receive link+the second signal–the second reconstructed interference signal $y_{aux2}$. It can be seen that the second reconstructed interference signal $y_{aux2}$ is obtained based on the pre-distortion processing coefficient. The more accurate and reasonable the pre-distortion processing coefficient is, the closer the second reconstructed interference signal $y_{aux2}$ is to the interference signal $y_{ord1\text{-}2}$ generated by the first signal in the receive link. After the self-interference clear is performed, the second reconstructed interference signal $y_{aux2}$ and the interference signal $y_{ord1\text{-}2}$ generated by the first signal in the receive link may cancel out each other as much as possible, so as to restore the second signal to the greatest extent. According to the embodiment of the present disclosure, the pre-distortion processing coefficient is obtained through self-adaptive learning, so that the pre-distortion processing coefficient obtained by the calculation has relatively high accuracy, and accordingly, the second signal can be accurately restored, thus improving a full-duplex digital self-interference clear effect.

According to the full-duplex digital self-interference clear method provided in the embodiment of the present disclosure, before the signal is transmitted with the peer device in the full-duplex mode, the pre-distortion processing coefficient is obtained by performing a calculation by the self-adaptive algorithm according to the preamble sequence sent from the transmit link, the first interference signal generated by the preamble sequence in the receive link, and the first reconstructed interference signal obtained by performing pre-distortion processing and reconstruction on the preamble sequence; under the condition that the signal is transmitted with the peer device in the full-duplex mode, the first signal sent from the transmit link to the peer device is subjected to pre-distortion processing according to the pre-distortion processing coefficient to obtain the second reconstructed interference signal, self-interference clear is performed according to the second reconstructed interference signal and the second interference signal of the receive link, and the second interference signal is the signal obtained through superposition of the interference signal generated by the first signal in the receive link and the second signal received by the receive link from the peer device. According to the embodiment of the present disclosure, co-time co-frequency full-duplex signal transmission and reception are supported, and the pre-distortion processing coefficient is generated through self-adaptive learning. On the one hand, accuracy of the pre-distortion processing coefficient can be improved, so that the interference signal can be counteracted to the greatest extent by the signal obtained through pre-distortion processing according to the pre-distortion processing coefficient, thereby improving the full-duplex digital self-interference clear effect; on the other hand, the pre-distortion processing coefficient is independent of the preamble sequence, the transmit link, the receive link and a signal transmission environment, thereby enhancing flexibility and universality of the system.

In some embodiments, the self-adaptive algorithm may include: an LS algorithm, an RLS algorithm, or an LMS algorithm. The RLS algorithm and the LMS algorithm need an iteration process while the LS algorithm does not need the iteration process. The LS algorithm needs to use a large amount of data for fitting, and thus is hard to be implemented by hardware, but the LS algorithm can produce a better learning effect of the pre-distortion processing coefficient, and may be used as a control of the other self-adaptive learning algorithms.

In some embodiments, responsive to determining that the pre-distortion processing coefficient is calculated by the RLS algorithm or the LMS algorithm, as shown in FIG. 3, performing a calculation by the self-adaptive algorithm according to the preamble sequence sent from the transmit link, the first interference signal generated by the preamble sequence in the receive link, and the first reconstructed interference signal obtained by performing pre-distortion processing and reconstruction on the preamble sequence to obtain the pre-distortion processing coefficient (i.e., operation 21) includes the following operations 211 to 213.

In operation 211, a current pre-distortion processing coefficient is calculated according to a current excitation signal in the preamble sequence, a first interference signal generated by the current excitation signal in the receive link, and a current first reconstructed interference signal.

The current first reconstructed interference signal is obtained by performing pre-distortion processing and reconstruction on the current excitation signal according to a pre-distortion processing coefficient obtained by a previous calculation. After the transmit link sends an excitation signal in the preamble sequence X(n), the excitation signal generates a first interference signal $y_{ord1}$ in the receive link.

In this operation, the self-adaptive learning module calculates the current pre-distortion processing coefficient according to the excitation signal, the first interference signal $y_{ord1}$ generated by the excitation signal in the receive link, and the first reconstructed interference signal $y_{aux1}$ obtained by performing pre-distortion processing and reconstruction on the excitation signal according to the pre-distortion processing coefficient obtained by the previous calculation. That is, the pre-distortion processing coefficient obtained by performing a calculation according to the current excitation signal is calculated based on the pre-distortion processing coefficient obtained by performing a calculation according to a previous excitation signal, that is, a result (i.e., the current pre-distortion processing coefficient) of a current iteration is calculated based on a result (i.e., the previous pre-distortion processing coefficient) of a previous iteration. In this way, an optimal pre-distortion processing coefficient may be obtained through continuous iterations.

In operation 212, it is determined whether an iteration end condition is met, and if it is determined that the iteration end condition is met, the operation 22 is performed; and if it is determined that the iteration end condition is not met, operation 213 is performed.

After a pre-distortion processing coefficient corresponding to one excitation signal in the preamble sequence X(n) is obtained by performing a calculation, one iteration is ended. In this operation, the pre-distortion processing module and the auxiliary link determine whether the iteration end condition is met, if the iteration end condition is met, the iterations are ended, and the pre-distortion processing coefficient obtained by the current calculation is used as a final pre-distortion processing coefficient used for self-interference clear, that is, the first signal sent by the transmit link to the peer device is subjected to pre-distortion processing according to the current pre-distortion processing coefficient to obtain the second reconstructed interference signal (that is, the operation 21 is performed); and if the iteration end condition is not met, the iterations need to be continued, and the operation 213 is performed.

In operation 213, a next excitation signal in the preamble sequence is subjected to pre-distortion processing according to the current pre-distortion processing coefficient to obtain a next first reconstructed interference signal, so as to calculate a pre-distortion processing coefficient corresponding to the next excitation signal in the preamble sequence.

In this operation, responsive to determining that the iteration end condition is not met and the transmit link sends the next excitation signal (e.g., the third excitation signal) in the preamble sequence, the pre-distortion processing module and the auxiliary link perform pre-distortion processing on the current third excitation signal according to a pre-distortion processing coefficient corresponding to the second excitation signal to obtain a first reconstructed interference signal corresponding to the third excitation signal, and calculate a pre-distortion processing coefficient corresponding to the third excitation signal according to the third excitation signal, a first interference signal generated by the third excitation signal in the receive link, and the first reconstructed interference signal corresponding to the third excitation signal for a next iteration calculation.

It should be noted that the operation 212 is performed after the operation 213 is completed, that is, after each iteration calculation of the pre-distortion processing coefficient is performed, determination of whether the iteration end condition is met needs to be performed to determine whether to end the iteration process.

One iteration calculation is completed after one pre-distortion processing coefficient is obtained by performing a calculation for one excitation signal in the preamble sequence X(n), and a current iteration calculation depends on a result of a previous iteration calculation until a result (i.e., the pre-distortion processing coefficient) of the iteration calculations gradually converges, thereby obtaining the accurate pre-distortion processing coefficient through self-adaptive learning.

In some embodiments, the iteration end condition being met includes: a current number of times of iterations being equal to a preset number of times, with the preset number of times being the same as the number of the excitation signals in the preamble sequence; or a difference between the first interference signal generated by the current excitation signal in the receive link and the current first reconstructed interference signal being less than a preset threshold. That is, after the pre-distortion processing coefficients corresponding to all (i.e., n) the excitation signals in the preamble sequence X(n) are calculated, the iteration process is ended, and a pre-distortion processing coefficient corresponding to the last excitation signal is used as the final pre-distortion processing coefficient, that is, after the iterations are performed for a preset number of times, the iteration process is ended regardless of whether the current pre-distortion processing coefficient actually converges. Or, once a difference between a first interference signal $y_{ord1}$ generated by a certain excitation signal in the receive link and a first reconstructed interference signal $y_{aux1}$ corresponding to the excitation signal is less than the preset threshold, which indicates that the pre-distortion processing coefficient has converged at this time, the iteration process is ended even if the iterations are not performed for a preset number of times.

For clearly explaining the technical solutions of the embodiments of the present disclosure, the calculation process of the pre-distortion processing coefficient is described below by taking the LS algorithm, the RLS algorithm, and the LMS algorithm as examples respectively.

(1) LS Algorithm

The LS algorithm does not need the iteration process, but needs to use a large amount of data for fitting, and thus is hard to be implemented by hardware. The LS algorithm can produce a better self-adaptive learning effect, and may be used as the control of the other self-adaptive learning algorithms.

$\Sigma[f(x, h(0), h(1), \ldots, h(n-1)-y]^2=min$, where x is an input value, and y is an expected value.

$$\sum [y_{si} - \bar{y}_{si}]^2 = min,$$

where $y_{si}$ represents an interference signal entering a digital side of the receive link, $\bar{y}_{si}$ represents a reconstructed interference signal obtained through reconstruction by the pre-distortion processing module and the auxiliary link.

For facilitating the implementation by hardware, the pre-distortion processing coefficient may be calculated in a progressive iteration manner, and both the RLS algorithm and the LMS algorithm belong to progressive iteration algorithms and may be adopted in the embodiments of the present disclosure. For the RLS algorithm and the LMS algorithm, different observation values need to be input, and after each time of introduction of new observation data and based on a previous estimation result, the previous estimation result may be corrected by a recursive algorithm according to the newly introduced observation data, so as to deduce a new estimated value of a parameter.

(2) RLS Algorithm $$y_i(n) = \sum_{k=0}^{n} h_i(k) * x_i(n-k) = h_i(0) * x_i(n) + h_i(1) * x_i(n-1) +$$

$$h_i(2) * x_i(n-2) + \dots + h_i(n) * x_i(0) \, e_i(n) = d_i(n) - y_i(n),$$

where $e_i(n)$ is an error, $d_i(n)$ is an expected value, and $y_i(n)$ is an estimated value;

$$e_i(n) = d_i(n) - y_i(n) = y_i^{si}(n) - \hat{y}_i^{si}(n)$$

$$\hat{y}_i^{si} = \sum_{k=0}^{n} h_i(k) * x_i(n-k) =$$

$$h_i(0) * x_i(n) + h_i(1) * x_i(n-1) + h_i(2) * x_i(n-2) + \dots + h_i(n) * x_i(0)$$

$$\varepsilon_i = \sum_{k} \lambda^{i-k} |e_i|^2,$$

where $\varepsilon_i$ is an error, a forgetting factor $\lambda$ is an integer less than 1.

Since $\lambda$ is an integer less than 1, the earlier a result is obtained, the less a weight of the result is. A partial derivative of h is calculated, and the following formula may be obtained:

$$\left[ \sum_{k} \lambda^{i-k} x_k x_k^T \right] h = \sum_{k} \lambda^{i-k} d_k x_k.$$

Definitions $$R_i = \sum_{k} \lambda^{i-k} x_k x_k^T$$

$$P_i = \sum_{k} \lambda^{i-k} d_k x_k$$

$$R_i w = P_i$$

$$R_{i+1} = \lambda R_i + x_{i+1} x_{i+1}^T$$

$$P_{i+1} = \lambda P_i + d_{i+1} x_{i+1}.$$

Definition:

$$T_i = R_i^{-1} = \left[ \lambda T_{i-1}^{-1} + x_i x_i^T \right]^{-1}.$$

An iteration equation of the RLS algorithm may be expressed as:

$$h_i = h_{i-1} + k_i e_{i|i-1}, \text{ where } e_{i|i-1} = d_i - h_{i-1}^T x_i.$$

(3) LMS Algorithm

By the LMS algorithm, a proper convergence factor is selected, so that an error between an actual calculation result and an expected response is searched downwards along a steepest direction of a curved surface with each iteration.

$$y_i(n) = \sum_{k=0}^{n} h_i(k) * x_i(n-k) =$$

$$h_i(0) * x_i(n) + h_i(1) * x_i(n-1) + h_i(2) * x_i(n-2) + \dots + h_i(n) * x_i(0);$$

$$e_i(n) = d_i(n) - y_i(n);$$

$$e_i(n) = d_i(n) - y_i(n) = y_i^{si}(n) - \hat{y}_i^{si}(n);$$

where $e_i(n)$ is an error, $d_i(n)$ is an expected value, and $y_i(n)$ is an estimated value.

$$\hat{y}_i^{si} = \sum_{k=0}^{n} h_i(k)^* x_i(n-k) =$$

$$h_i(0) * x_i(n) + h_i(1)^* x_i(n-1) + h_i(2) * x_i(n-2) + \dots + h_i(n) * x_i(0);$$

$$E(h) = \frac{1}{2} \sum_{n}^{N} (d_i(n) - y_i(n))^2 = \frac{1}{2} \sum_{n} \left[ d_i(n) - \sum_{k} h_i(k) * x_i(n-k) \right]^2,$$

where $E(h)$ is an error.

$$g = \frac{\partial E}{\partial h} = \sum_{n} e * x, \, h_{i+1} = h_i + u * g = h_i + u * e * x.$$

An iteration equation of the LMS algorithm may be expressed as:

$$h_i = h_{i-1} + u * g * x = h_{i-1} + u * \left( \sum_{n} e * x \right) * x,$$

$$\text{where } d = \sum_{k} h_{ideal}(k) * x(n-k);$$

$$g = \sum_{n} e * x;$$

$$e = d - y = \sum_{k} h_{ideal}(k) * x(n-k) - \sum_{k} h_i(k) * x(n-k).$$

According to the embodiments of the present disclosure, the interference signal is reconstructed, and the pre-distortion processing coefficient is obtained through multiple times of iteration calculations by adopting the self-adaptive learning technology, so that the signal subjected to pre-distortion processing can counteract the interference signal to the greatest extent. With the technical solutions provided in the embodiments of the present disclosure, a radio device can operate in a real co-frequency full-duplex mode, and frequency spectrum efficiency can be effectively improved. For SI signals in 5G or other wireless full-duplex communication systems, an interference signal is reconstructed in a digital domain, and then the reconstructed interference signal is subtracted from a total received signal, thereby achieving the purpose of clearing the interference. By combining self-adaptive learning for obtaining the pre-distortion processing coefficient with pre-distortion processing, universality of the digital SIC can be improved, and an expected digital SIC effect can be finally produced by performing multiple iterations by the self-adaptive learning algorithm.

Based on the same technical concept, an embodiment of the present disclosure further provides a full-duplex digital self-interference clear apparatus. As shown in FIG. 4, the full-duplex digital self-interference clear apparatus includes a transmit link 101, a receive link 102, an auxiliary link 103, a self-adaptive learning module 104, a pre-distortion processing module 105, and a self-interference clear module 106, wherein the pre-distortion processing module 105 is connected to the self-adaptive learning module 104, the auxiliary link 103, and the self-interference clear module 106, and the self-adaptive learning module 104 is connected to the transmit link 101 and the receive link 102.

The transmit link 101 is configured to send a first signal to a peer device under the condition that signal is transmitted with the peer device in a full-duplex mode.

The receive link 102 is configured to receive a second signal sent from the peer device under the condition that the signal is transmitted with the peer device in the full-duplex mode.

The transmit link 101 is further configured to send a preamble sequence before the signal is transmitted with the peer device in the full-duplex mode.

The self-adaptive learning module 104 is configured to, before the signal is transmitted with the peer device in the full-duplex mode, perform a calculation by a self-adaptive algorithm to obtain a pre-distortion processing coefficient according to the preamble sequence sent from the transmit link, a first interference signal generated by the preamble sequence in the receive link, and a first reconstructed interference signal obtained by performing pre-distortion processing and reconstruction on the preamble sequence.

The pre-distortion processing module 105 and the auxiliary link 103 are configured to perform pre-distortion processing and reconstruction on the preamble sequence to obtain the first reconstructed interference signal, and under the condition that the signal is transmitted with the peer device in the full-duplex mode, perform pre-distortion processing on the first signal sent from the transmit link 101 to the peer device according to the pre-distortion processing coefficient to obtain a second reconstructed interference signal.

The self-interference clear module 106 is configured to perform self-interference clear according to the second reconstructed interference signal and a second interference signal of the receive link; and the second interference signal received by the receive link 102 is a signal obtained through superimposition of an interference signal generated by the first signal in the receive link and the second signal received by the receive link from the peer device.

In some embodiments, a structure of the auxiliary link 103 is the same as that of the transmit link 101, or the structure of the auxiliary link 103 is the same as that of the receive link 102.

Figure 5:
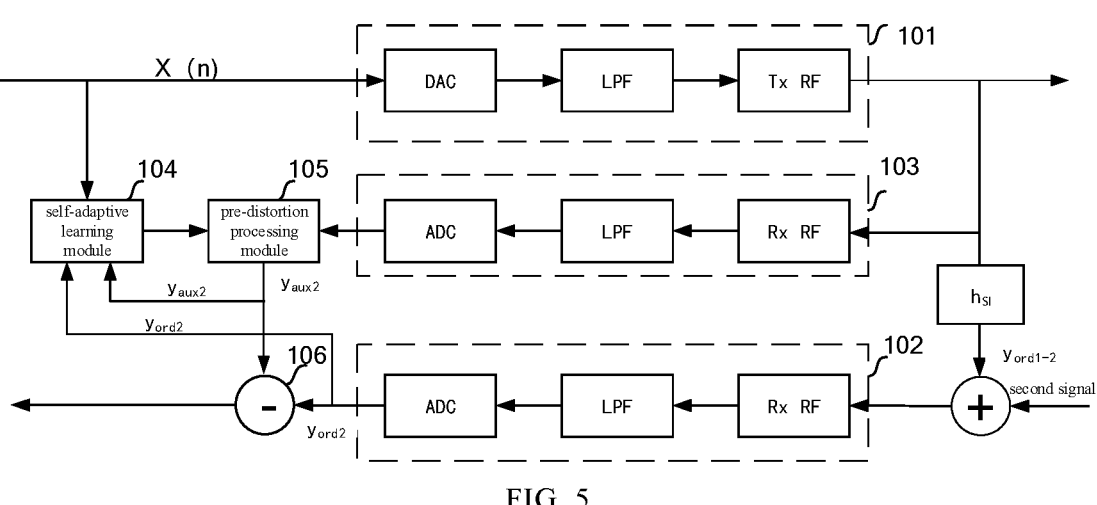
FIG. 5 is another schematic diagram of a full-duplex digital self-interference clear apparatus according to an embodiment of the present disclosure.

In the embodiment of the present disclosure, a description is given below by taking the structure of the auxiliary link 103 being the same as that of the receive link 102 as an example. As shown in FIG. 5, each of the auxiliary link 103 and the receive link 102 may include: an analog-to-digital converter (ADC), a low-pass filter (LPF), and a receive-link radio frequency module (Rx RF), the receive-link radio frequency module, the low-pass filter, and the analog-todigital converter are connected in sequence, the analog-to-digital converter is connected to the self-interference clear module 106, and the receive-link radio frequency module is connected to an antenna of the receive link 102.

The transmit link 101 may include: a digital-to-analog converter (DAC), a low-pass filter, and a transmit-link radio frequency module (Tx RF), the transmit-link radio frequency module, the low-pass filter, and the digital-to-analog converter are connected in sequence, the digital-to-analog converter is connected to the self-adaptive learning module 104, and the transmit-link radio frequency module is connected to an antenna of the transmit link 101.

In some embodiments, the self-adaptive learning module 104 is configured to perform a calculation by an LS algorithm, an RLS algorithm, or an LMS algorithm to obtain the pre-distortion processing coefficient.

In some embodiments, the self-adaptive learning module 104 is configured to perform a calculation by the RLS algorithm or the LMS algorithm to obtain the pre-distortion processing coefficient: a current pre-distortion processing coefficient is calculated according to a current excitation signal in the preamble sequence, a first interference signal generated by the current excitation signal in the receive link, and a current first reconstructed interference signal, and the current first reconstructed interference signal is obtained by performing pre-distortion processing and reconstruction on the current excitation signal according to a pre-distortion processing coefficient obtained by a previous calculation.

The pre-distortion processing module 105 and the auxiliary link 103 are configured to, in response to determining that an iteration end condition is not met, perform pre-distortion processing on a next excitation signal in the preamble sequence according to the current pre-distortion processing coefficient to obtain a next first reconstructed interference signal, so as to enable the self-adaptive learning module to calculate a pre-distortion processing coefficient corresponding to the next excitation signal in the preamble sequence.

In some embodiments, the pre-distortion processing module 105 and the auxiliary link 103 are further configured to, in response to determining that the iteration end condition is met, perform pre-distortion processing on the first signal sent by the transmit link to the peer device according to the current pre-distortion processing coefficient, so as to obtain the second reconstructed interference signal.

In some embodiments, the iteration end condition being met includes: a current number of times of iterations being equal to a preset number of times, with the preset number of times being the same as the number of the excitation signals in the preamble sequence; or a difference between the first interference signal generated by the current excitation signal in the receive link and the current first reconstructed interference signal being less than a preset threshold.

Compared with the existing technology, by adopting the full-duplex digital self-interference clear method and apparatus according to the embodiments of the present disclosure, co-time co-frequency full-duplex signal transmission and reception are supported; and by using the self-adaptive learning module to generate the pre-distortion processing coefficient, the flexibility and the universality of the system are improved.

It should be understood by those of ordinary skill in the art that the functional modules/units in all or some of the operations and the devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary implementations using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular implementation can be used alone or in combination with features, characteristics and/or elements described in connection with other implementations. Therefore, it should be understood by those of ordinary skill in the art that various changes in the forms and the details can be made without departing from the scope of the present disclosure of the appended claims.

What is claimed is:

1. A full-duplex digital self-interference clear method, comprising:

sending a preamble sequence by a transmit link;

performing pre-distortion processing and reconstruction on the preamble sequence to obtain a first reconstructed interference signal;

performing a calculation by a self-adaptive algorithm to obtain a pre-distortion processing coefficient according to the preamble sequence, a first interference signal generated by the preamble sequence in a receive link, and the first reconstructed interference signal;

sending, under the condition of a signal transmission with a peer device in a full-duplex mode, a first signal by the transmit link to the peer device and performing pre-distortion processing on the first signal according to the pre-distortion processing coefficient to obtain a second reconstructed interference signal; and receiving a second signal by the receive link from the peer device and performing self-interference clear according to the second reconstructed interference signal and a second interference signal of the receive link, the second interference signal of the receive link being a signal obtained through superimposition of an interference signal in the receive link generated by the first signal and the second signal received by the receive link from the peer device.

2. The method of claim 1, wherein the self-adaptive algorithm comprises: a Least Squares (LS) algorithm, a Recursive Least Squares (RLS) algorithm, or a Least Mean Squares (LMS) algorithm.

3. The method of claim 2, wherein, under a condition that the self-adaptive algorithm is the RLS algorithm or the LMS algorithm, performing the calculation by the self-adaptive algorithm to obtain the pre-distortion processing coefficient according to the preamble sequence, the first interference signal generated by the preamble sequence in the receive link, and the first reconstructed interference signal comprises:

calculating a current pre-distortion processing coefficient according to a current excitation signal in the preamble sequence, a first interference signal generated by the current excitation signal in the receive link, and a current first reconstructed interference signal, wherein the current first reconstructed interference signal is obtained by performing pre-distortion processing and reconstruction on the current excitation signal according to a pre-distortion processing coefficient obtained by a previous calculation; and performing, in response to an iteration end condition being not met, pre-distortion processing on a next excitation signal in the preamble sequence according to the current pre-distortion processing coefficient to obtain a next first reconstructed interference signal, so as to calculate a pre-distortion processing coefficient corresponding to the next excitation signal in the preamble sequence.

4. The method of claim 3, wherein performing pre-distortion processing on the first signal according to the pre-distortion processing coefficient to obtain the second reconstructed interference signal comprises:

performing, in response to the iteration end condition being met, pre-distortion processing on the first signal sent from the transmit link to the peer device according to the current pre-distortion processing coefficient to obtain the second reconstructed interference signal.

5. The method of claim 3, wherein the iteration end condition being met comprises:

a current number of times of iterations being equal to a preset number of times, with the preset number of times being the same as a number of excitation signals in the preamble sequence; or a difference between the first interference signal generated by the current excitation signal in the receive link and the current first reconstructed interference signal being less than a preset threshold.

6. A full-duplex digital self-interference clear apparatus, comprising a transmit link, a receive link, an auxiliary link, a self-adaptive learning machine, a pre-distortion processor, and a self-interference eliminator, wherein the pre-distortion processor is connected to the self-adaptive learning machine, the auxiliary link, and the self-interference eliminator, and the self-adaptive learning machine is connected to the transmit link and the receive link;

wherein the transmit link is configured to send a first signal to a peer device under the condition of a signal transmission with the peer device in a full-duplex mode;

wherein the receive link is configured to receive a second signal sent from the peer device under the condition of the signal transmission with the peer device in the full-duplex mode;

wherein the transmit link is further configured to send a preamble sequence before the signal transmission with the peer device in the full-duplex mode;

wherein the self-adaptive learning machine is configured to, before the signal transmission with the peer device in the full-duplex mode, perform a calculation by a self-adaptive algorithm to obtain a pre-distortion processing coefficient according to the preamble sequence sent from the transmit link, a first interference signal generated by the preamble sequence in the receive link, and a first reconstructed interference signal obtained by performing pre-distortion processing and reconstruction on the preamble sequence;

wherein the pre-distortion processor and the auxiliary link are configured to perform pre-distortion processing and reconstruction on the preamble sequence to obtain the first reconstructed interference signal, and under the condition of the signal transmission with the peer device in the full-duplex mode, perform pre-distortion processing on the first signal sent from the transmit link to the peer device according to the pre-distortion processing coefficient to obtain a second reconstructed interference signal; and wherein the self-interference eliminator is configured to perform self-interference clear according to the second reconstructed interference signal and a second interference signal of the receive link, the second interference signal of the receive link being a signal obtained through superimposition of an interference signal generated by the first signal in the receive link and the second signal received by the receive link from the peer device.

7. The apparatus of claim 6, wherein a structure of the auxiliary link is the same as a structure of the transmit link, or the structure of the auxiliary link is the same as a structure of the receive link.

8. The apparatus of claim 6, wherein the self-adaptive learning machine is configured to perform a calculation by an LS algorithm, an RLS algorithm, or an LMS algorithm to obtain the pre-distortion processing coefficient.

9. The apparatus of claim 8, wherein the self-adaptive learning machine is further configured to perform a calculation by the RLS algorithm or the LMS algorithm to obtain the pre-distortion processing coefficient, wherein a current pre-distortion processing coefficient is calculated according to a current excitation signal in the preamble sequence, a first interference signal generated by the current excitation signal in the receive link, and a current first reconstructed interference signal, and the current first reconstructed interference signal is obtained by performing pre-distortion processing and reconstruction on the current excitation signal according to a pre-distortion processing coefficient obtained by a previous calculation;

the pre-distortion processor and the auxiliary link are further configured to, in response to determining that an iteration end condition is not met, perform pre-distortion processing on a next excitation signal in the preamble sequence according to the current pre-distortion processing coefficient to obtain a next first reconstructed interference signal, so as to enable the self-adaptive learning machine to calculate a pre-distortion processing coefficient corresponding to the next excitation signal in the preamble sequence.

10. The apparatus of claim 9, wherein the pre-distortion processor and the auxiliary link are further configured to, in response to determining that the iteration end condition is met, perform pre-distortion processing on the first signal sent by the transmit link to the peer device according to the current pre-distortion processing coefficient, so as to obtain the second reconstructed interference signal.

11. The apparatus of claim 9, wherein the iteration end condition being met comprises:

a current number of times of iterations being equal to a preset number of times, with the preset number of times being the same as a number of excitation signals in the preamble sequence; or a difference between the first interference signal generated by the current excitation signal in the receive link and the current first reconstructed interference signal being less than a preset threshold.

* * * * *